United States Patent
Hazlewood et al.

(10) Patent No.: US 8,321,662 B2
(45) Date of Patent: Nov. 27, 2012

(54) CERTIFICATE RENEWAL USING SECURE HANDSHAKE

(75) Inventors: Kristin Marie Hazlewood, Austin, TX (US); Annemarie Rose Fitterer, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1178 days.

(21) Appl. No.: 12/117,031

(22) Filed: May 8, 2008

(65) Prior Publication Data

US 2009/0313468 A1    Dec. 17, 2009

(51) Int. Cl.
*H04L 29/06* (2006.01)

(52) U.S. Cl. ........ 713/156; 713/155; 713/157; 713/158; 713/159; 726/10; 380/28; 380/29; 380/30

(58) Field of Classification Search .................. 713/175, 713/155–159; 709/225, 229; 726/10
See application file for complete search history.

(56) References Cited

U.S. PATENT DOCUMENTS

| | | | |
|---|---|---|---|
| 6,339,827 B1 | 1/2002 | Stokes et al. | |
| 6,931,528 B1 | 8/2005 | Immonen | |
| 2002/0184493 A1* | 12/2002 | Rees | 713/158 |
| 2003/0105955 A1* | 6/2003 | Carroll et al. | 713/156 |
| 2004/0171369 A1 | 9/2004 | Little et al. | |
| 2005/0071630 A1* | 3/2005 | Thornton et al. | 713/156 |
| 2005/0188196 A1 | 8/2005 | Kakii | |
| 2009/0144540 A1* | 6/2009 | Davis et al. | 713/156 |

OTHER PUBLICATIONS

Kai Qin et. al., Improvement of WTLS Protocol security, 2012 IEEE Symposium ojn Robotics and Applications (ISRA).*

* cited by examiner

*Primary Examiner* — Taghi Arani
*Assistant Examiner* — Josnel Jeudy
(74) *Attorney, Agent, or Firm* — Garg Law Firm, PLLC; Rakesh Garg; Jeffrey S. LaBaw (57) ABSTRACT

A method, system, and computer usable program product for certificate renewal using a secure handshake are provided in the illustrative embodiments. A determination is made, forming an expiration determination, whether a validity period associated with a certificate ends within a predetermined period from a time of receiving the certificate. If the expiration determination is true, a holder of the certificate is notified about the expiration. The holder may be an application executing in a data processing system or the data processing system itself. A new certificate is requested on behalf of the holder. The requested new certificate is received. The new certificate is sent to the holder of the certificate over a network.

18 Claims, 4 Drawing Sheets

CERTIFICATE RENEWAL USING SECURE HANDSHAKE

BACKGROUND OF THE INVENTION

1. Field of the Invention

The present invention relates generally to an improved data processing system, and in particular, to a computer implemented method for managing security in a data processing system. Still more particularly, the present invention relates to a computer implemented method, system, and computer usable program code for certificate renewal using a secure handshake.

2. Description of the Related Art

Applications executing on different data processing systems communicate with each other over data networks. Some of these data communications may have to include certain security mechanisms, such as encryption or digital signatures, to ensure that the data contained in the communication is hidden or not readable while in transit.

Encryption is the process of transforming information referred to as plaintext, using an algorithm called cipher, to make the plaintext unreadable to anyone except those possessing special knowledge, usually referred to as a key. The result of this process is encrypted information, which, in cryptography is referred to as ciphertext. The detailed operation of a cipher is controlled both by the algorithm and by a key.

In some other data communications, security mechanisms based on encryption may prevent repudiation of the communication by one or both parties, such as by using digital signatures. A digital signature provides a method of authenticating the author of a message or communication based on the digital signature of that message, in a manner analogous to a handwritten signature. A digital signature may also be used to prove that a message has not been modified since it was initially signed.

In some data communications, the security mechanism is designed to ensure the identity of the data processing systems on each end of the data communication, and encrypting the data communication between the two communicating systems. Solutions based on public key cryptography are commonly used for these purposes in data communications. A public key cryptography solution uses two "keys", a public key and a private key, referred to as a "key pair", as part of a mathematical transformation applied to a message. These keys are related in a manner such that when a ciphertext created with a particular algorithm and one of the keys is processed with the corresponding algorithms and the other key of the key pair, the original message is returned.

Further, in solutions for secured data communications, a "digital certificate" is used to associate an identity, such as an identity of the user, or of a data process system, with one half of the key pair—the "public" key—used in the public cryptography based solution. In particular, this process allows a message, signed with a "private" key known only to the entity signing the message to be transmitted, optionally with the digital certificate, so that the recipient can validate the signature, verifying that the message was signed by the entity identified in the digital certificate.

A digital certificate is also known simply as a certificate. Usually, a certificate is "signed" by a trusted third party, such as the issuer of the certificate called a certificate authority (CA), who can attest to the identity of the holder of the certificate to some degree.

Certificates can be assigned to software applications as well as data processing systems. Software applications and data processing systems can use the certificates, and the keys bound to the certificates, for authentication, encryption, non-repudiation, and other uses.

One use of public key cryptography and certificates is in secure sockets layer (SSL) communication and transport layer security (TLS). SSL communication is a secure method of communicating private information over public networks, such as over the Internet. In SSL communication, one system, called the client, requests a secure communication with another system, called the server. The client and the server negotiate a cipher to use for the communication. The server then signs a message using this cipher and presents its certificate together with this message, which authenticates the server and provides the server's public key to the client. The client generates a random number to be used as a key for the secure communication session. The random number is called the session key. The client encrypts the session key using the server's public key from the server's certificate and sends to the server. The server decrypts the encrypted session key using its private key and obtains the session key to use in the secure communication session with the client.

This and other similar approaches can be used to validate the identity of communicating parties, based on the encryption of messages or information and subsequent message communication or information exchange together with the certificate. In some implementations, this overall process may be modified by not exchanging the digital certificate with every message/information exchange, instead relying on the receiving party having a copy of the certificate, or having the ability to retrieve the certificate.

SUMMARY OF THE INVENTION

The illustrative embodiments provide a method, system, and computer usable program product for certificate renewal using a secure handshake. A determination is made, forming an expiration determination, whether a validity period associated with a certificate ends within a predetermined period from a time of receiving the certificate. If the expiration determination is true, a holder of the certificate is notified about the expiration. The holder may be an application executing in a data processing system or the data processing system itself. A new certificate is requested on behalf of the holder. The requested new certificate is received. The new certificate is sent to the holder of the certificate over a network.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

TLS is a new version of the security protocol that may replace SSL in the future. There are differences between TLS and SSL specifications and implementations. However, TLS and SSL are similar to one another and interchangeably usable for the purpose of the illustrative embodiments described in this disclosure.

When an application receives a certificate in response to a request for an SSL communication, the application can perform several steps to verify that the certificate is valid. Verifying validity of a certificate may include verifying various aspects of a certificate. As an example, in validating a certificate, an application may process the certificate against a root certificate of the certificate authority who signed the certificate. A root certificate is a certificate of a certificate authority, which can be stored in a certificate repository of the application and can be used for verifying that the certificate authority trusts the holder of the certificate, such as a server of a server certificate being presented.

A step in verifying the validity of a certificate is ensuring that the holder of the certificate is presenting the certificate within a validity period of the certificate. A validity period of a certificate is a duration, usually from a start date to an end date, within which the certificate can be used for secure communication with the holder of the certificate, such as over SSL or TLS. In some cases, an application may not use a certificate that is within a predetermined period from the end date of the certificate's validity period.

Illustrative embodiments recognize that data processing environments that employ secure data communications, certificate maintenance is a labor intensive, personnel dependent, and an error prone process. For example, when a certificate associated with a server data processing system expires or nears expiry, a user has to detect this condition. The user then has to generate a new certificate or request a new certificate from a certificate authority. The user then has to force a communication from the server to many client applications and data processing systems that the existing server certificate is being replaced with a new server certificate. Additionally, once a new certificate is available, the user has to take an action to remove expired or expiring certificate from the server's certificate repository. Furthermore, the user has to take an action or force the server to take an action to remove the expired or expiring certificate from the certificate repositories of the many clients.

Illustrative embodiments recognize that managing certificate expiration can be tedious and error prone process. For example, depending on the number of clients and servers, the number of data processing systems involved in secured communication with one another, and the number of certificates in use for such secured communications, a user may spend many hours over many days performing the certificate management task. Even then, the user may forget to replace an expired certificate in a particular data processing system causing a secured communication to fail in the future. Illustrative embodiments further recognize that failing to manage the expiration of certificates in a data processing system may lead to breach in data security. The breach of security and the vulnerability of secure data communications as a result of mismanaging expired certificates is undesirable.

Expired and expiring certificates are collectively referred to as expired certificates in this disclosure. In other words, "expired certificates" refers to certificates whose end date of validity has passed as well as certificates whose end date of validity is within a predetermined period from the date or time the certificate is presented for a secure data communication.

The illustrative embodiments further recognize that often, users may not be aware than certificates may have expired, or nearing expiry in their data processing environment. The illustrative embodiments further recognize that the users may or may not be able to renew the certificates, or renew them timely, in order to correct this vulnerability.

To address these and other problems related to certificate renewal, the illustrative embodiments provide a method, system, and computer usable program product for certificate renewal using a secure handshake. The illustrative embodiments may be used in conjunction with any application or any data processing system that may use certificates for secure data communications, including but not limited to SSL communication or TLS communication.

For example, the illustrative embodiments may be implemented with a directory server, a name server, a user location service server (ULS server), an application server, a web server, a proxy server, a mail server, a feed server, or any other type of data server. The illustrative embodiments may also be implemented with any business application, enterprise software, and middleware applications or platforms.

The illustrative embodiments may be used in conjunction with a variety of communication protocols, such as lightweight directory access protocol (LDAP), hypertext transport protocol (HTTP), and any other data communication protocol that may accommodate various aspects of the illustrative embodiments. Additionally, the illustrative embodiments may be implemented in conjunction with a hardware component, such as in a firmware, as embedded software in a hardware device, or in any other suitable hardware or software form.

Any advantages listed herein are only examples and are not intended to be limiting on the illustrative embodiments. Additional advantages may be realized by specific illustrative embodiments. Furthermore, a particular illustrative embodiment may have some, all, or none of the advantages listed above.

Figure 1:
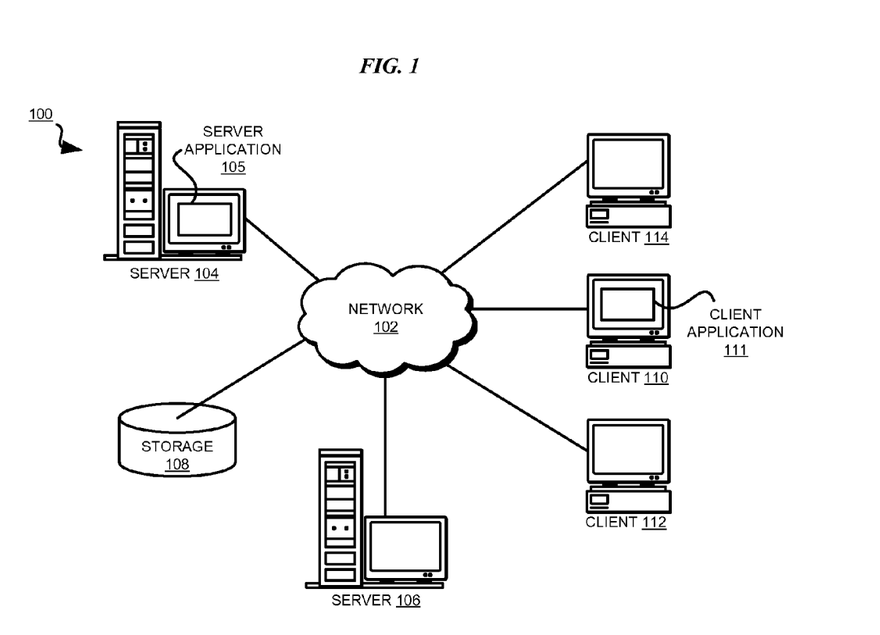
FIG. 1 depicts a pictorial representation of a network of data processing systems in which illustrative embodiments may be implemented.
Figure 2:
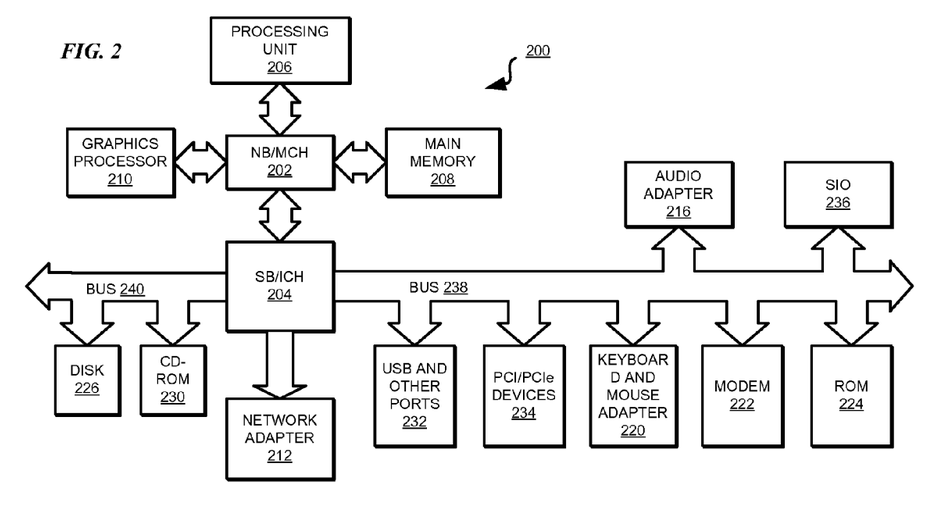
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes server application 105, which may be an example of a software application, in conjunction with which the illustrative embodiments may be implemented. Client 110 may include client application 111, which may engage in a secure data communication with server application 105.

In addition, clients 110, 112, and 114 couple to network 102. Any of clients 110, 112, and 114 may have an application, typically a client application, executing thereon. As an example, client 112 is depicted to have browser 113 executing thereon. Browser 113 may be a commonly used web-browser.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
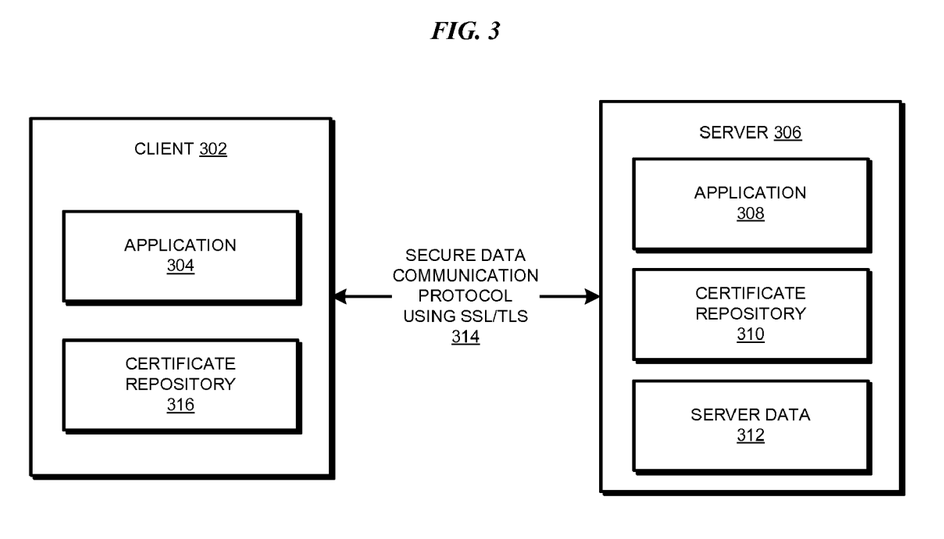
FIG. 3 depicts a block diagram of a secure data communication in which the illustrative embodiments may be implemented.

With reference to FIG. 3, this figure depicts a block diagram of a secure data communication in which the illustrative embodiments may be implemented. Client 302 and application 304 may be implemented using client 110 and client application 111 in FIG. 1 respectively. Server 306 and application 308 may be implemented using server 104 and server application 105 in FIG. 1 respectively.

Server 306 may further include certificate repository 310, where application 308 and other applications executing on server 306 may read, write, or manipulate certificates. Application 308 may serve data from server data 312 to application 304 over secure data communication 314 using a certificate from certificate repository 310. Application 304 may similarly read, write, or manipulate the certificate received from application 308 in this manner in certificate repository 316.

Secure data communication 314 may use any protocol capable of using a secure form of data communication such as SSL or TLS. For example, LDAP over SSL or TLS may be one such protocol used in secure data communication 314. HTTPS, which is a secure form of HTTP utilizing SSL, may be another example.

A client may request a secure communication with a server beginning with a handshake. A handshake is an exchange of one of more messages or communications between the client and the server so that the two systems come to terms on parameters to use for the subsequent secure communication. A handshake is also called a secure handshake.

For example, in an SSL based communication, negotiating a cipher to use for the communication, the server presenting its certificate together with this message, the client generating and sending a session key to the server, are parts of a secure handshake. A secure data communication follows a successful secure handshake. A successful secure handshake is a secure handshake where the client and the server are able to agree on the parameters of the secure data communication. For example, in a secure handshake for an SSL based secure data communication, the secure handshake is successful when the client and the server agree on the cipher, the client accepts the server's certificate, and the server accepts the session key. A secure handshake where only one of the two engaged parties presents a certificate is also known as a one-way handshake or a one-way secure handshake.

In some cases, the secure handshake may include the client presenting its certificate to the server and the server accepting the client certificate as well. This type of secure handshake is known as a two-way handshake, or a two-way secure handshake. In systems for secure data communications that use two-way secure handshakes, the secure data communication follows a successful two-way secure handshake. For example, in a two-way secure handshake for an SSL based secure data communication, the two-way secure handshake is successful when the client and the server agree on the cipher, the client accepts the server's certificate, the server accepts the client's certificate, and the server accepts the session key.

Application 308 on server 306 may present a server certificate to application 304 on client 302 in a secure handshake in the course of establishing secure data communication 314. In addition, application 304 on client 302 may present a server certificate to application 308 on server 306 in a two-way secure handshake in the course of establishing secure data communication 314. Accepting a certificate includes validating a certificate. Validating a certificate includes determining whether the certificate is within a predetermined period from the end date of the certificate's validity period.

Figure 4:
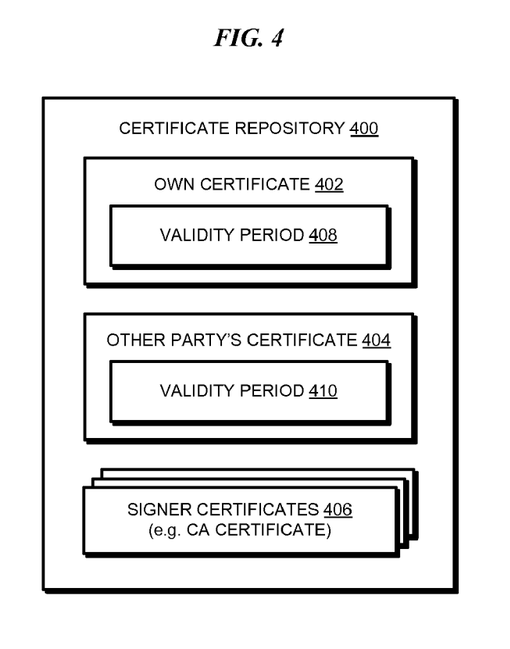
FIG. 4 depicts a block diagram of an organization of a certificate repository in accordance with an illustrative embodiment.

With reference to FIG. 4, this figure depicts a block diagram of an organization of a certificate repository in accordance with an illustrative embodiment. Certificate repository 400 may be implemented using any of certificate repositories 310 or 316 in FIG. 3.

An application, such as application 304 in client 302 or application 308 in server 306 in FIG. 3, may use certificate repository 400 for reading, writing, or manipulating certificates. For example, a client application may store its own certificate, own certificate 402, in certificate repository 400. Certificate repository 400 may also be usable for storing other parties' certificate, other party's certificate 404. For example, a client may write as other party's certificate 404 a server's certificate that the client receives during a secure handshake. Certificate repository 400 may further include signer certificate 406, which may be root certificates for one or more certificate authorities.

Associated with each certificate is a validity period, usually specified as a start data and an end date. Own certificate 402 includes validity period 408. Other party's certificate 404 includes validity period 410. A certificate in signer certificates 406 may also include a validity period, although a signer's certificate can be perpetually valid by having no end date or an end date far into the future.

In accordance with an illustrative embodiment, in accepting a certificate, an application may determine whether the certificate has expired or is expiring by using the validity period associated with the certificate. The application may be a server application accepting a client's certificate, or a client application accepting a server's certificate. For example, the application may determine that the certificate has already expired, or is expiring within a predetermined period from the end date of the certificate's validity period.

If the application determines that the certificate is expiring or has expired in this manner, the application may not accept the certificate. In one embodiment, the application may accept an expiring certificate in conjunction with additional steps as described with respect to some illustrative embodiments below. In another embodiment, the application may perform additional steps as described with respect to some illustrative embodiments below, when presented with an expired certificate.

Figure 5:
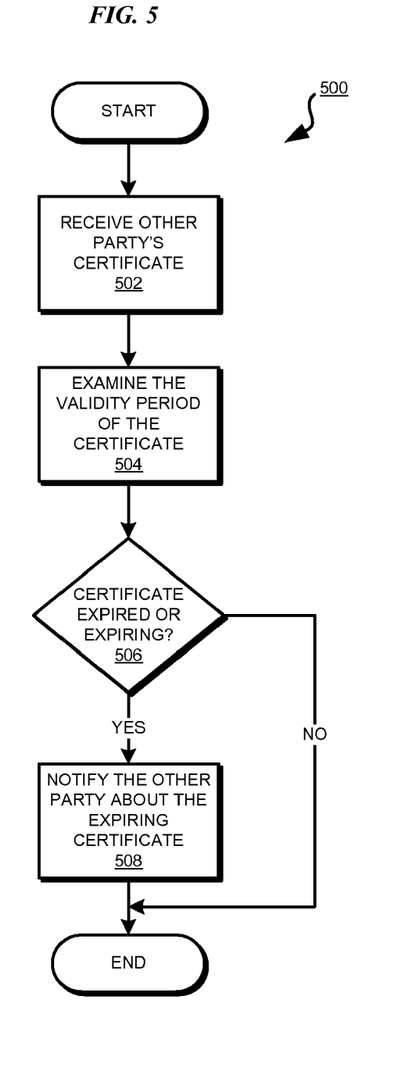
FIG. 5 depicts a flowchart of a process of notifying about a certificate expiration in accordance with an illustrative embodiment.

With reference to FIG. 5, this figure depicts a flowchart of a process of notifying about a certificate expiration in accordance with an illustrative embodiment. Process 500 may be implemented in an application, such as any of applications 304 and 310 in FIG. 3. In one embodiment, process 500 may be implemented in a certificate repository, such as certificate repository 400 in FIG. 4. In another embodiment, process 500 may be implemented in a combination of an application and a certificate repository.

Process 500 begins by receiving a certificate from a party to a secure data communication (step 502). Process 500 examines the validity period of the certificate received in step 502 (step 504). Process 500 determines if the certificate has already expired or is expiring within a predetermined period (step 506).

If the certificate has already expired or is expiring ("Yes" path of step 506), process 500 notifies the party about the expiration (step 508). Process 500 ends thereafter. If the certificate has not already expired or is not expiring within a predetermined period ("No" path of step 506), process 500 ends as well.

For example, process 500 may notify the holder of the certificate received in step 502, who is the other party engaged in the secure handshake preceding the secure data communication, that the certificate has already expired or is expiring within a predetermined time period. Furthermore, the notification may take any form suitable for a particular implementation. For example, a directory client application may notify a directory server that the server's certificate is expiring in three days. The directory client may notify the directory server by invoking an extended operation or by sending a control in a LDAP request or command.

As another example, a directory client may present its certificate to a directory server in a two-way secure handshake. The directory server may detect that the directory client's certificate is expiring within two weeks. The directory server may notify the directory client about the expiration in an LDAP response.

An extended operation is an operation or a function that can be performed with respect to a directory. Typically, an extended operation is implemented as code that can execute in conjunction with a directory and perform the function or the operation on the directory. In some instances, the extended operation may accept a request or a command, execute the request or command on the directory, and return data or other information as a response. In some instances, executing an extended operation may also result in information being recorded, a directory being manipulated, or other action.

A control, also called an LDAP control, is a parameter specified in a request to a directory. The directory includes code that may interpret the parameter, the control, and take a predetermined action on the directory. In some instances, including a control in a request or command may result in a response being sent to the sender of the control, a response including certain data, information being recorded, a directory being manipulated, or other action.

As another example in accordance with an illustrative embodiment, a client application, such as a web browser, may notify a web server that the server's certificate is expired or expiring by including a parameter in a HTTPS request. The parameter included in the HTTPS request may operate as a control in LDAP request to notify the web server of the expiration in accordance with an illustrative embodiment.

The extended operation, the LDAP control, the HTTPS parameter are all described only as examples for the clarity of the description and are not limiting on the illustrative embodiments. Communications in many other protocols may be similarly modified to communicate from one application to another a notification of certificate expiry without departing from the scope of the illustrative embodiments. Furthermore, a communication in a protocol may be modified in accordance with the an illustrative embodiment such that a client may notify a server or a server may notify a client about the other's respective certificate.

Figure 6:
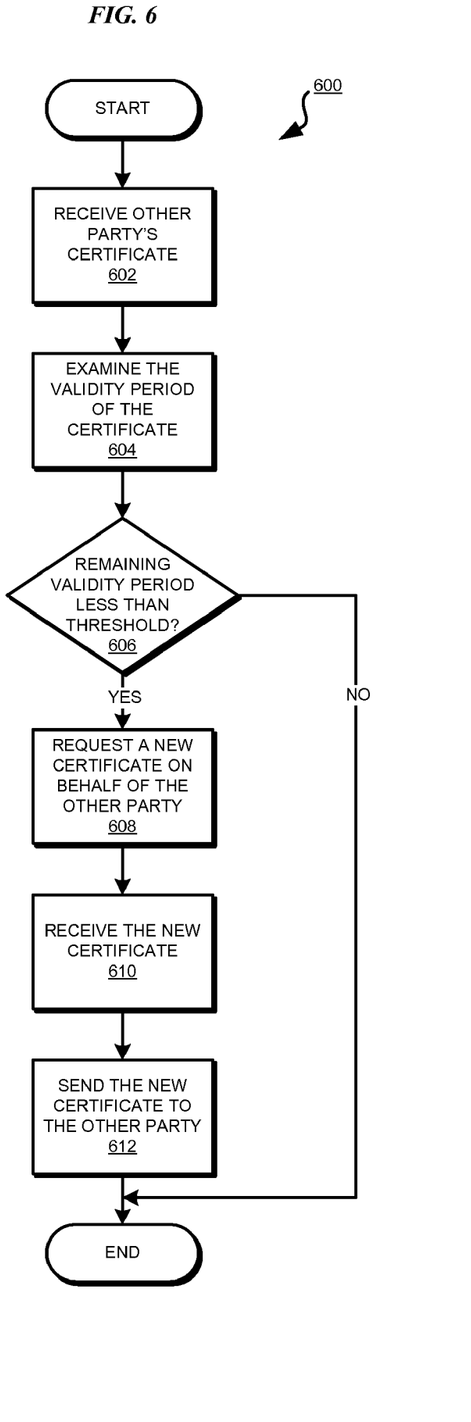
FIG. 6 depicts a flowchart of a process or renewing a certificate in accordance with an illustrative embodiment.

With reference to FIG. 6, this figure depicts a flowchart of a process or renewing a certificate in accordance with an illustrative embodiment. Process 600 may be implemented in an application, such as any of applications 304 and 310 in FIG. 3. In one embodiment, process 600 may be implemented in a certificate repository, such as certificate repository 400 in FIG. 4. In another embodiment, process 600 may be implemented in a combination of an application and a certificate repository.

Process 600 begins by receiving a certificate from a party to a secure data communication (step 602). Process 600 examines the validity period of the certificate received in step 602 (step 604). Process 600 determines if the certificate has already expired or is expiring within a predetermined period (step 606).

If the certificate has not already expired or is not expiring within a predetermined period ("No" path of step 506), process 600 ends thereafter. If the certificate has already expired or is expiring ("Yes" path of step 606), process 600 requests a new certificate on behalf of the other party who is the holder of the certificate received in step 602 (step 608).

In one embodiment, a client application may be enabled to make the request of step 608 on behalf of a server application. In such an embodiment, the client may have access to the credentials of the server that a certificate authority might use for renewing the server's certificate. Additionally, the client may have sufficient privileges to make the request on server's behalf. A data processing environment that may enable such an embodiment may enable a client such that the client can be trusted with the server's information for making the request of step 608.

In an embodiment, the client may be able to change certain aspects of the server's certificate during a request for renewal as in step 608. For example, a client may be able to select a certificate authority different from the certificate authority of the expiring certificate, or a self certifying ability of the server, to renew the server's certificate.

Continuing with process 600, process 600 may receive a certificate for the other party (step 610). Process 600 may send the certificate in step 610 to the other party (step 612). Process 600 ends thereafter.

In one embodiment, process 600 may send the certificate to the other party using an extended operation, control, or an equivalent thereof. In another embodiment, process 600 may send the certificate to the other party using a secure data communication different from the secure data communication in which the handshake occurred. For example, a client may receive a renewed certificate on a server's behalf. The client may then send the new certificate to the server using Pretty Good Privacy (PGP) method. In another embodiment, process 600 may send the new certificate to a third party, such as an administrator, for installation at the other party of step 602.

The examples in the description of steps 608, 610, and 612 are not limiting on the illustrative embodiments. A particular implementation may request, receive, and send the new certificate in any way suitable for that implementation environment without departing from the scope of the illustrative embodiments.

Furthermore, process 600, as in the case of process 500, may be implemented in a client application to renew a server certificate, or in a server application to renew a client certificate. In some implementations, a server may be able to renew a client's certificate more easily as compared to a client being able to renew a server's certificate. For example, in a directory environment, a directory server may generally be able to require or mandate a certificate renewal from a client. Consequently, the directory server may be able to perform process 600 for renewing the directory's client's certificate. On the other hand, as described above, the directory's client may have be a designated client with access to information related to the directory server that may be considered sensitive in some directory environments.

Figure 7:
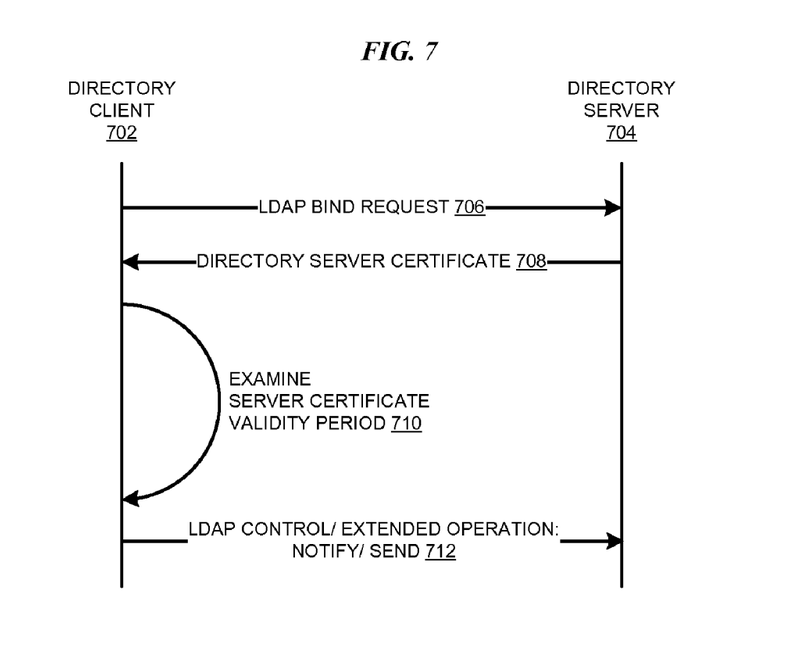
FIG. 7 depicts a timing diagram of renewing a server certificate in a directory environment in accordance with an illustrative embodiment.

With reference to FIG. 7, this figure depicts a timing diagram of renewing a server certificate in a directory environment in accordance with an illustrative embodiment. Directory client 702 may be implemented using application 304 in FIG. 3. Directory server 704 may be implemented using application 308 in FIG. 3.

Directory client 702 may send a directory bind request 706 to directory server 704. Directory bind request 706 may be a request for a secure data communication and may initiate a secure handshake.

Directory server 704 may respond with directory server certificate 708 in furtherance of the secure handshake. Directory client 702 may perform examination 710 of directory server certificate 708's validity period. If directory client 702 determines that directory server certificate 708 is expired or expiring within a predetermined period, directory client 702 may send LDAP control or extended operation 712 to directory server 704. Directory client 702 may send one or more controls, or extended operations to directory server 704 for notifying about the certificate expiry and for sending a renewed certificate in the manner of process 600.

Upon receiving a notification in the manner described above, directory server 704 or any application or data processing system in similar circumstances of the illustrative embodiment may have several options. For example, directory server 704 may itself request a new certificate. As some other examples, directory server 704 may decide not to renew its certificate, not renew using the previous certificate authority, notify an administrator, self certify while simultaneously requesting a renewed certificate from a certificate authority, or self certify for a period in the future. These example actions are not limiting on the illustrative embodiments. Other applications or data processing systems engaging in secure data communications in accordance with the illustrative embodiments may take other suitable actions based on the notification without departing from the scope of the illustrative embodiments.

Figure 8:
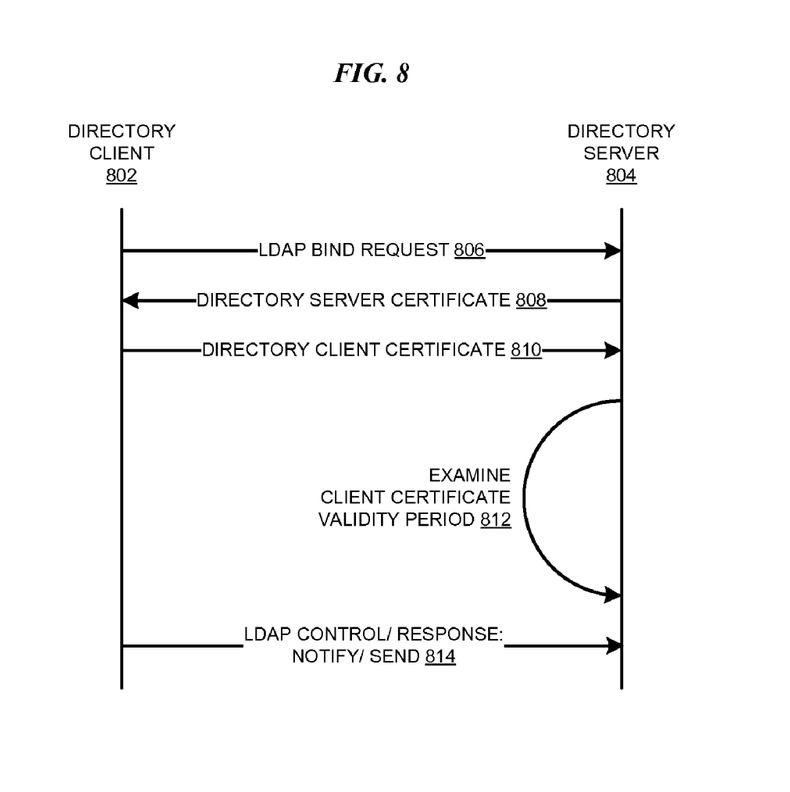
FIG. 8 depicts a timing diagram of renewing a client certificate in a directory environment in accordance with an illustrative embodiment.

With reference to FIG. 8, this figure depicts a timing diagram of renewing a client certificate in a directory environment in accordance with an illustrative embodiment. Directory client 802 may be implemented using application 304 in FIG. 3. Directory server 804 may be implemented using application 308 in FIG. 3.

Directory client 802 may send a directory bind request 806 to directory server 804. Directory bind request 806 may be a request for a secure data communication and may initiate a two-way secure handshake.

Returning to FIG. 8, directory server 804 may respond with directory server certificate 808 in furtherance of the two-way secure handshake. Directory client 802 may send directory client certificate 810 to directory server 804 in furtherance of the two-way secure handshake. Directory server 804 may perform examination 812 of directory client certificate 810's validity period. If directory server 804 determines that directory client certificate 810 is expired or expiring within a predetermined period, directory server 804 may send LDAP control or response 814 to directory client 802. Directory server 804 may send one or more controls or responses 814 to directory client 802 for notifying about the certificate expiry and for sending a renewed certificate in the manner of process 600.

In one embodiment, directory server 804 may send a message or command to directory client 802 to initiate a secure data communication. For example, directory server 804 may periodically perform a certificate status check on directory client 802 by sending a request to initiate a secure data communication. Directory server 804 and directory client 802 may then exchange their respective certificates in a secure handshake or a two-way secure handshake.

The components in the block diagrams and the steps in the flowcharts and timing diagrams described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for certificate renewal using a one-way secure handshake or a two-way secure handshake. An application or a data processing system may receive a certificate from another application or data processing system in a secure handshake to establish a secure data communication. The application or data processing system receiving the certificate may be a client or a server, and the application or data processing system sending the certificate may be a server or a client respectively.

The application or data processing system receiving the certificate makes a determination whether the received certificate is expired or expiring within a predetermined period. Based on this determination, the receiving application or data processing system may notify the sending application or data processing system.

Based on this determination, the receiving application or data processing system may also request and receive a new certificate on behalf of the sending application or data processing system. The receiving application or data processing system may then send the new certificate to the sending application or data processing system.

Thus, the illustrative embodiments provide a method, system, and computer usable program product for reducing or eliminating dependency on users for detecting certificate expiration. Illustrative embodiments allow the detection of certificate expiration to occur automatically, that is, without user intervention. The illustrative embodiments also allow for automatic renewal of expired or expiring certificates without user intervention. By using the illustrative embodiments in the manner described in this disclosure, a data processing environment can be kept functioning for secure data communications. The illustrative embodiments also help in removing or reducing errors in a manual certificate renewal process.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for certificate renewal using secure handshake, the method comprising:
   determining, to form an expiration determination, whether a validity period associated with a certificate ends within a predetermined period from a time of receiving the certificate from a holder of the certificate during the secure handshake, wherein the certificate is received as a part of a secure handshake, wherein the secure handshake is a part of a secure data communication;
   notifying, responsive to the expiration determination being true, the holder of the certificate, the holder being one of a first application executing in a first data processing system and the first data processing system, the holder being a party engaged in the secure handshake;
   requesting a new certificate on behalf of the holder;
   receiving the new certificate; and
   sending the new certificate to the holder of the certificate over a network.

2. The method of claim 1, wherein the expiration determination is formed by one of a second application executing on a second data processing system and the second data processing system, forming a receiver of the certificate, and wherein the receiver of the certificate and the holder of the certificate are engaged in the secure data communication.

3. The method of claim 2, wherein the secure handshake is one of a one-way secure handshake and a two-way secure handshake.

4. The method of claim 2, wherein the determining, notifying, requesting, receiving, and sending occur automatically at the receiver.

5. The method of claim 2, wherein the first data processing system is a server data processing system and the first application is a server application executing on the server data processing system, and wherein the second application is a client application executing in a client data processing system and the second data processing system is the client data processing system.

6. The method of claim 1, wherein the certificate is stored in a directory server, and notifying further comprises:
   using one of an extended operation and an LDAP control on the directory server to notify the directory server about the expiry of the certificate.

7. A computer usable program product comprising a computer usable storage device including computer usable code for certificate renewal using secure handshake, the computer usable code comprising:
   computer usable code for determining, to form an expiration determination, whether a validity period associated with a certificate ends within a predetermined period from a time of receiving the certificate from a holder of the certificate during the secure handshake, wherein the certificate is received as a part of a secure handshake, wherein a secure handshake is a part of the secure data communication;
   computer usable code for notifying, responsive to the expiration determination being true, a holder of the certificate, the holder being one of a first application executing in a first data processing system and the first data processing system, the holder being a party engaged in the secure handshake;
   computer usable code for requesting a new certificate on behalf of the holder;
   computer usable code for receiving the new certificate; and
   computer usable code for sending the new certificate to the holder of the certificate over a network.

8. The computer usable program product of claim 7, wherein the expiration determination is formed by one of a second application executing on a second data processing system and the second data processing system, forming a receiver of the certificate, and wherein the receiver of the certificate and the holder of the certificate are engaged in the secure data communication.

9. The computer usable program product of claim 8, wherein the secure handshake is one of a secure one-way handshake and a two-way secure handshake.

10. The computer usable program product of claim 8, wherein the computer usable code for determining, the computer usable code for notifying, the computer usable code for requesting, the computer usable code for receiving, and the computer usable code for sending execute automatically at the receiver.

11. The computer usable program product of claim 8, wherein the first data processing system is a server data processing system and the first application is a server application executing on the server data processing system, and wherein the second application is a client application executing in a client data processing system and the second data processing system is the client data processing system.

12. The computer usable program product of claim 7, wherein the certificate is stored in a directory server, and notifying further comprises:
computer usable code for using one of an extended operation and an LDAP control on the directory server to notify the directory server about the expiry of the certificate.

13. A data processing system for certificate renewal using secure handshake, the data processing system comprising:
a storage device, wherein the storage device stores computer usable program code; and
a processor, wherein the processor executes the computer usable program code, and wherein the computer usable program code comprises:
computer usable code for determining, to form an expiration determination, whether a validity period associated with a certificate ends within a predetermined period from a time of receiving the certificate from a holder of the certificate during the secure handshake, wherein the certificate is received as a part of a secure handshake, wherein a secure handshake is a part of the secure data communication;
computer usable code for notifying, responsive to the expiration determination being true, a holder of the certificate, the holder being one of a first application executing in a first data processing system and the first data processing system, the holder being a party engaged in the secure handshake;
computer usable code for requesting a new certificate on behalf of the holder;
computer usable code for receiving the new certificate; and
computer usable code for sending the new certificate to the holder of the certificate over a network.

14. The data processing system of claim 13, wherein the expiration determination is formed by one of a second application executing on a second data processing system and the second data processing system, forming a receiver of the certificate, and wherein the receiver of the certificate and the holder of the certificate are engaged in the secure data communication.

15. The data processing system of claim 14, wherein the secure handshake is one of a secure one-way handshake and a two-way secure handshake.

16. The data processing system of claim 14, wherein the computer usable code for determining, the computer usable code for notifying, the computer usable code for requesting, the computer usable code for receiving, and the computer usable code for sending execute automatically at the receiver.

17. The data processing system of claim 14, wherein the first data processing system is a server data processing system and the first application is a server application executing on the server data processing system, and wherein the second application is a client application executing in a client data processing system and the second data processing system is the client data processing system.

18. The data processing system of claim 13, wherein the certificate is stored in a directory server, and notifying further comprises:
computer usable code for using one of an extended operation and an LDAP control on the directory server to notify the directory server about the expiry of the certificate.

* * * * *